US011830481B2

(12) United States Patent
Morrison et al.

(10) Patent No.: US 11,830,481 B2
(45) Date of Patent: Nov. 28, 2023

(54) CONTEXT-AWARE PROSODY CORRECTION OF EDITED SPEECH

(71) Applicant: Adobe Inc., San Jose, CA (US)

(72) Inventors: Maxwell Morrison, Evanston, IL (US); Zeyu Jin, San Francisco, CA (US); Nicholas Bryan, Belmont, CA (US); Juan Pablo Caceres Chomali, San Francisco, CA (US); Lucas Rencker, Paris (FR)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/538,683

(22) Filed: Nov. 30, 2021

(65) Prior Publication Data

US 2023/0169961 A1   Jun. 1, 2023

(51) Int. Cl.
*G10L 15/18*  (2013.01)
*G10L 25/90*  (2013.01)
(Continued)

(52) U.S. Cl.
CPC .......... *G10L 15/1807* (2013.01); *G10L 15/02* (2013.01); *G10L 15/04* (2013.01);
(Continued)

(58) Field of Classification Search
CPC ..... G10L 15/1807; G10L 15/02; G10L 15/04; G10L 15/16; G10L 15/187;
(Continued)

(56) References Cited

U.S. PATENT DOCUMENTS 5,490,234 A * 2/1996 Narayan ................ G10L 13/07
                                                              704/265
6,745,155 B1 * 6/2004 Andringa ............ G10L 21/0208
                                                            704/E11.006
(Continued)

OTHER PUBLICATIONS

Adobe Demos "Photoshop For Audio," Lets You Edit Speech as Easily as Text, ARS Technica, (4 pages), 2016, https://arstechnica.com/information-technology/2016/11/adobe-voco-photoshop-for-audio-speech-editing/ (Year: 2016).*
(Continued)

*Primary Examiner* — Fariba Sirjani
(74) *Attorney, Agent, or Firm* — Kilpatrick Townsend & Stockton LLP

(57) ABSTRACT

Methods are performed by one or more processing devices for correcting prosody in audio data. A method includes operations for accessing subject audio data in an audio edit region of the audio data. The subject audio data in the audio edit region potentially lacks prosodic continuity with unedited audio data in an unedited audio portion of the audio data. The operations further include predicting, based on a context of the unedited audio data, phoneme durations including a respective phoneme duration of each phoneme in the unedited audio data. The operations further include predicting, based on the context of the unedited audio data, a pitch contour comprising at least one respective pitch value of each phoneme in the unedited audio data. Additionally, the operations include correcting prosody of the subject audio data in the audio edit region by applying the phoneme durations and the pitch contour to the subject audio data.

20 Claims, 6 Drawing Sheets

(51) Int. Cl.
| | |
|---|---|
| G10L 15/187 | (2013.01) |
| G10L 15/02 | (2006.01) |
| G10L 15/04 | (2013.01) |
| G10L 15/16 | (2006.01) |
| G10L 21/0208 | (2013.01) |

(52) U.S. Cl.
CPC ............ *G10L 15/16* (2013.01); *G10L 15/187* (2013.01); *G10L 21/0208* (2013.01); *G10L 25/90* (2013.01); *G10L 2015/025* (2013.01); *G10L 2021/02082* (2013.01)

(58) Field of Classification Search
CPC .................. G10L 21/0208; G10L 25/90; G10L 2015/025; G10L 2021/02082; G10L 704/232
See application file for complete search history.

(56) References Cited

U.S. PATENT DOCUMENTS

| | | | | |
|---|---|---|---|---|
| 8,890,869 | B2* | 11/2014 | Duwenhorst | G06T 11/001 345/440.1 |
| 2006/0149558 | A1* | 7/2006 | Kahn | G10L 15/063 704/278 |
| 2006/0259303 | A1* | 11/2006 | Bakis | G10L 13/10 704/268 |
| 2008/0235025 | A1* | 9/2008 | Murase | G10L 21/003 704/260 |
| 2008/0300702 | A1* | 12/2008 | Gomez | G10L 25/48 700/94 |
| 2014/0035920 | A1* | 2/2014 | Duwenhorst | G06T 11/001 345/440 |
| 2018/0247636 | A1* | 8/2018 | Arik | G10L 25/30 |
| 2019/0130894 | A1* | 5/2019 | Jin | G10L 21/00 |
| 2019/0163807 | A1* | 5/2019 | Jain | G06F 40/30 |
| 2020/0027440 | A1* | 1/2020 | Kilgore | G06F 3/017 |
| 2021/0082396 | A1* | 3/2021 | Luan | G10L 13/10 |

OTHER PUBLICATIONS

Descript: All-in-One Audio & Video Editing, as Easy as a Doc, Available Online at: https://www.descript.com/, 2020, pp. 1-4.
Boersma et al., Praat: Doing Phonetics by Computer, Available Online at: http://www.praat.org/, 2006, pp. 1-2.
Ioffe et al., Batch Normalization: Accelerating Deep Network Training by Reducing Internal Covariate Shift, In Proceedings of the 32nd International Conference on International Conference on Machine Learning, vol. 37, Mar. 2, 2015, pp. 1-11.
Ito et al., The LJ Speech Dataset, Available Online at: https://keithito.com/LJ-Speech-Dataset/, 2017, pp. 1-5.
Jadoul et al., Introducing Parselmouth: A Python Interface to Praat, Journal of Phonetics, vol. 71, Nov. 2018, pp. 1-15.
Jia et al., Transfer Learning from Speaker Verification to Multispeaker Text-To-Speech Synthesis, Advances in Neural Information Processing Systems, Dec. 2018, pp. 1-11.
Jin et al., VoCo: Text-Based Insertion and Replacement in Audio Narration, Association for Computing Machinery Transactions on Graphics, vol. 36, No. 4, Jul. 2017, pp. 96:1-96:13.
Kim et al., Crepe: A Convolutional Representation for Pitch Estimation, Institute of Electrical and Electronics Engineers International Conference on Acoustics, Speech and Signal Processing, Apr. 2018, pp. 161-165.
Kumar et al., MeIGAN: Generative Adversarial Networks for Conditional Waveform Synthesis, Advances in Neural Information Processing Systems, Oct. 2019, pp. 1-12.
Lancucki, Fastpitch: Parallel Text-to-Speech with Pitch Prediction, International Conference on Acoustics, Speech and Signal Processing, Jun. 2021, 5 pages.
McCurdy, Tentative Standards for Sound Level Meters, Electrical Engineering, vol. 55, No. 3, Mar. 1936, pp. 260-263, Abstract, pp. 1-2.
Morise et al., World: A Vocoderbased High-Quality Speech Synthesis System for Real-Time Applications, Institute of Electronics, Information and Communication Engineers, Transactions on Information and Systems, Jul. 2016, pp. 1877-1885.
Morrison et al., Controllable Neural Prosody Synthesis, Interspeech, Mar. 2021, 6 pages.
Morrison, Torchcrepe, GitHub, Available Online at: https://github.com/maxrmorrison/torchcrepe, 2020, 6 pages.
Moulines et al., Pitch-Synchronous Waveform Processing Techniques for Text-to-Speech Synthesis Using Diphones, Speech Communication, vol. 9, Aug. 1990, pp. 453-467.
Nooteboom et al., The Prosody of Speech: Melody and Rhythm, The Handbook of Phonetic Sciences, vol. 5, Jan. 1997, pp. 1-48.
Ochshorn et al., Gentle Forced Aligner, GitHub, Available Online at: https://github.com/lowerquality/gentle, 2017, 2 pages.
Park et al., g2pE: A Simple Python Module for English Grapheme to Phoneme Conversion, GitHub, Available Online at: https://github.com/Kyubyong/g2p, 2019, pp. 1-4.
Prenger et al., Waveglow: A Flow-Based Generative Network for Speech Synthesis, Institute of Electrical and Electronics Engineers, International Conference on Acoustics, Speech and Signal Processing, May 2019, 5 pages.
Ren et al., Fastspeech 2: Fast and High-Quality End-to-End Text to Speech, Audio and Speech Processing, Available Online at: https://arxiv.org/pdf/2006.04558.pdf, Aug. 2020, pp. 1-15.
Ren et al., FastSpeech: Fast, Robust and Controllable Text to Speech, Advances in Neural Information Processing Systems, Nov. 2019, pp. 1-10.
Rubin et al., Content-Based Tools for Editing Audio Stories, In Proceedings of the 26th Annual Association for Computing Machinery Symposium on User Interface Software and Technology, Oct. 8-11, 2013, pp. 113-122.
Su et al., HiFi-GAN: High-Fidelity Denoising and Dereverberation Based on Speech Deep Features in Adversarial Networks, Interspeech, Available Online at: https://arxiv.org/pdf/2006.05694.pdf, Sep. 21, 2020, 5 pages.
Valin et al., LPCNet: Improving Neural Speech Synthesis Through Linear Prediction, Institute of Electrical and Electronics Engineers International Conference on Acoustics, Speech and Signal Processing, May 2019, pp. 5891-5895.
Wang, Fundamental Frequency Modeling for Neural-Network-Based Statistical Parametric Speech Synthesis, The Graduate University for Advanced Studies, Sep. 2018, pp. 1-185.
Yuan et al., Speaker Identification on the Scotus Corpus, Journal of the Acoustical Society of America, May 2008, 4 pages.

* cited by examiner

CONTEXT-AWARE PROSODY CORRECTION OF EDITED SPEECH

TECHNICAL FIELD

This disclosure generally relates to audio enhancement and, more specifically, to automatically correcting prosody in edited speech, such as when speech has been edited via a text-based speech editor or other technique.

BACKGROUND

People make various types of speech audio recordings in their daily lives. For instance, recording telephonic conferences, video blogs (vlogs), podcasts, videos to be posted on social media or placed elsewhere, voice messages, audio-books, and others are among the recordings a person might make once or on a regular basis. In some cases, a user may wish to modify an existing speech audio recording, for instance, to remove or add words to make the audio fit a desired purpose. A common example includes editing a message on an automated conferencing system or other phone system (e.g., AVR or voicemail system) to modify the options provided to a call participant or to provide up-to-date information without needing to rerecord the entire applicable audio recording. Another common example is editing a speech audio track of a recorded presentation without having to rerecord the entire presentation. Various other scenarios and applications exist where speech audio recordings might require editing.

Conventional speech editors (including text-based speech editors) facilitate the process of editing speech audio recordings by permitting, in some cases, editing via intuitive cut, copy, and paste operations on a speech transcript. For instance, given the audio data encoding of the speech "the forecast calls for rain today" spoken by a specific speaker, a user might wish to replace "rain" with "clear skies" to accurately reflect the forecast for the day. The user could have access to a speech audio recording of that specific speaker representing the words "clear skies," and in that case, the user could use a text-based speech editor to cut out the word "rain" and insert the words "clear skies" in its place, thus forming the phrase "the forecast calls for clear skies today."

Although text-based speech editors provide an easy way to modify chunks of audio data, a drawback of text-based speech editors is prosody discontinuity. Specifically, edited audio data often sound unnatural at its cut points because of prosody mismatches at those cut points. Prosody refers to how words are spoken, such as in terms of pitch and rhythm. The prosody that a given speaker might apply to a phrase could differ depending on the context in which that phrase is spoken. As a result, simply pasting a phrase of one or more words spoken by a speaker into other audio of that speaker could lead to a mismatch in prosody, even though the speaker is unchanged. Thus, although techniques exist for cutting and pasting speech together, the resulting audio is still likely to sound cut and pasted, rather than sounding like a unified whole.

SUMMARY

In some embodiments, one or more processing devices perform operations to correct prosody in subject audio data within an edit region of an audio recording. For instance, the audio recording could be a speech audio recording, in which the subject audio data is speech audio data. The operations include predicting phoneme durations of the subject audio data in the edit region in a context-aware manner, predicting a pitch contour of the subject audio data in a context-aware manner, applying to the subject audio data a target prosody including the phoneme durations and the pitch contour, and removing artifacts from the subject audio data.

An example of a correction system described herein receives an indication of an edit region of an audio recording and an index that demarcates the edit region from an unedited audio portion of the audio recording. For example, the edit region may be a portion of audio recording that has been modified in some way, and the unedited audio portion is outside the edit region. The correction system applies a phoneme duration model to subject audio data in the edit region in the context of unedited audio data in the unedited audio portion to predict phoneme durations including a respective phoneme duration for each phoneme in the subject audio data. The correction system applies a pitch generation model to the subject audio data in the context of the unedited audio data to predict a pitch contour including at least one respective pitch value for each phoneme, given the phoneme durations, in the subject audio data. Together, the phoneme durations and the pitch contour form a target prosody for the subject audio data.

An example of the correction system uses a digital signal processing technique to apply the target prosody to the subject audio data in the edit region and, further, applies an artifact removal model to remove artifacts from the subject audio data introduced through the digital signal processing. The resulting version of the subject audio data is thus high-quality audio data that has prosodic continuity with the unedited audio data.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
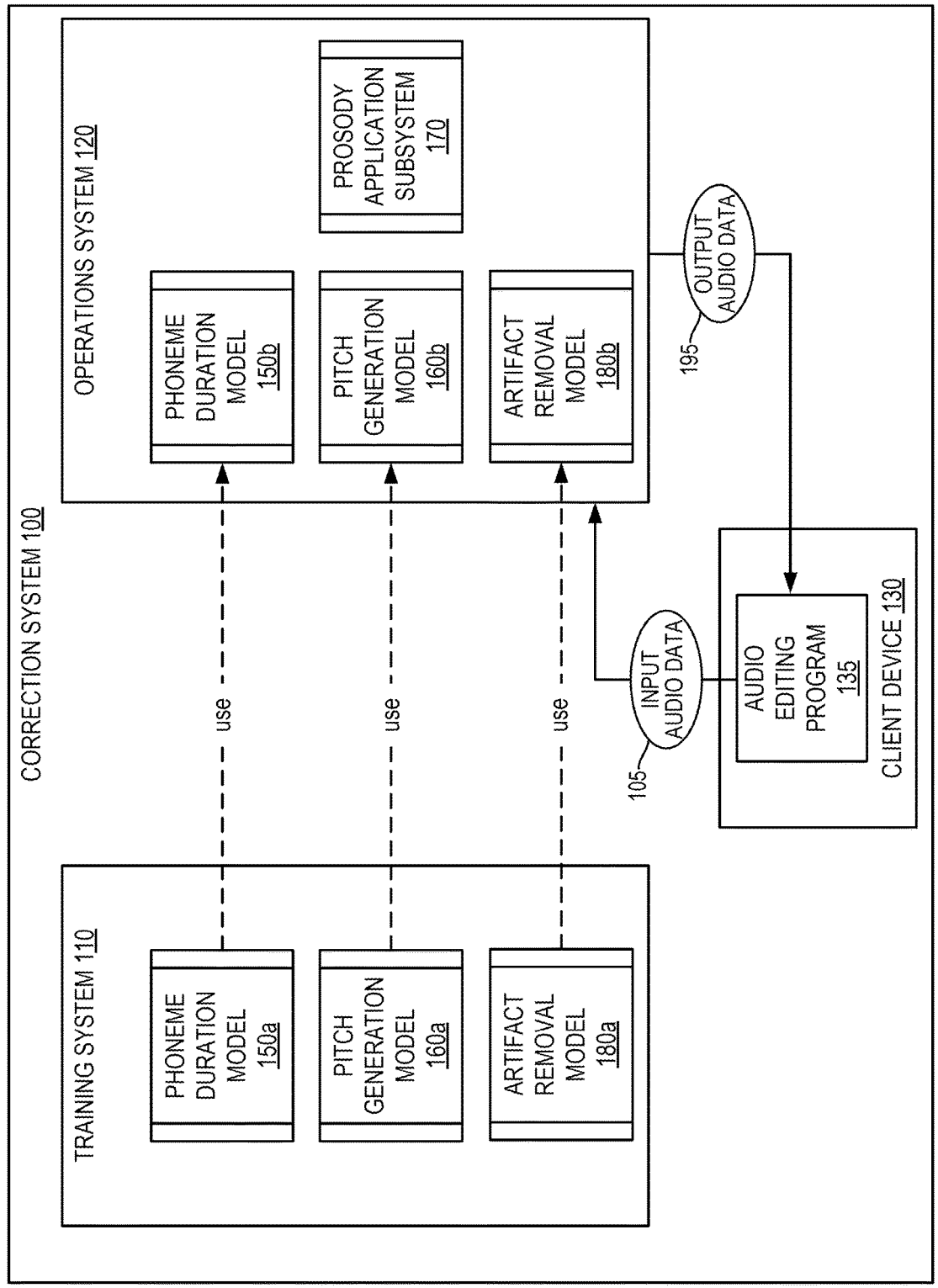
FIG. 1 is a diagram of an example architecture of a correction system for correcting prosody of subject audio data in an edit region of an audio recording, according to some embodiments described herein.

Existing systems to edit speech audio recordings come with significant drawbacks in terms of prosody. Specifically, existing systems typically do not or cannot account for variations in prosody when performing edited operations, such as cutting, copying, and pasting. As a result, edited speech often sounds like it has been edited, lacking a natural transition in prosody across cut points. Text-based speech editing methods are capable of performing cut, copy, and paste operations on audio data including speech at the phoneme level, but the resulting output audio data exhibits flattened prosody or boundary discontinuities.

Some embodiments described herein facilitate speech audio editing in a context-aware manner, such that prosody is automatically adjusted to produce natural sounding output audio data. For instance, given subject audio data including edited audio data in an audio recording, an example correction system described herein predicts, based on unedited audio data in an unedited portion of the audio recording, phoneme durations including a respective phoneme duration for each phoneme in the subject audio data. The correction system additionally divides the audio edit region into frames, or audio frames, and predicts a respective pitch for each such frame associated with the subject audio data. Given the pitches for the frames, the correction system can determine pitch contour including at least one respective pitch value for each phoneme in the subject audio data. Together, the phoneme durations and the pitch contour form a predicted prosody that is used as a target prosody for the subject audio data. Some embodiments then apply pitch-shifting and time-stretching, as well as artifact removal, to the subject audio data based on this target prosody, thus resulting in the subject audio data having prosodic continuity with the unedited portion of the audio recording.

The following non-limiting example is provided to introduce certain embodiments. In this example, a correction system for correcting prosody in subject audio data accesses (e.g., receives) input audio data. The input audio data is an audio recording that includes both unedited audio data in an unedited audio portion and subject audio data in an audio edit region of the audio recording. In this example, the subject audio data in the edit region was specified or modified using text-based speech editing, and thus, a transcript of the unedited audio portion and the audio edit region are available. Additionally, or alternatively, however, some other editing technique may be used. In that case, a speech-to-text technique may be used to provide a transcript of the audio edit region and the unedited audio portion.

In this example, the correction system predicts a duration of each phoneme in the subject audio data in the edit region, where the predicted duration is a prediction of the time to speak the phoneme based on the phoneme durations in the unedited audio data of the unedited audio portion. To this end, the correction system utilizes a machine learning (ML) model referred to herein as a phoneme duration model. The phoneme duration model is, for example, a neural network such as a sequence-to-sequence model. The correction system applies the phoneme duration model to the sequence of phonemes in the input audio data, including the subject audio data and the unedited audio data, as identified in the transcript. The phoneme duration model thus predicts and outputs a respective duration for each phoneme in the subject audio data.

Given the duration of each phoneme in the unedited audio data in the unedited audio portion and the predicted duration of each phoneme in the audio edit region, the correction system may use a second ML model, referred to herein as a pitch generation model, to predict a pitch contour for the subject audio data. More specifically, in this example, the correction system applies the pitch generation model to each frame of speech of a predetermined length (e.g., ten milliseconds) given the phoneme durations. The pitch generation model thus predicts and outputs a respective pitch for each frame of the audio edit region. Together, the duration and pitch of the subject audio data, as predicted by the phoneme duration model and the pitch generation model, form a target prosody for the subject audio data.

In this example, the correction system applies the target prosody to the subject audio data. To this end, the correction system uses a digital signal processing (DSP) technique for pitch-shifting and time-stretching, such as a DSP-based vocoder (i.e., a synthesizer that produces an audio signal based on input data). In some instances, the DSP technique introduces audio artifacts, such as noise or reverberation, into the subject audio data. As such, in this example, the correction system applies an artifact removal model, which may be a trained neural network designed to reduce such audio artifacts. The resulting subject audio data has prosodic continuity with the unedited audio data in the unedited audio portion due to the context-aware determination of the target prosody for the subject audio data. Thus, when the subject audio data is combined with the unedited audio data, the prosody across the cut points of that combination has a natural sound.

Certain embodiments described herein represent improvements in the technical field of audio enhancement. Specifically, some embodiments utilize novel techniques of predicting phoneme duration and pitch contour so as to predict a target prosody for subject audio data in an audio edit region. These novel techniques determine high-level control parameters describing how to perform digital signal processing to manipulate time and pitch of the subject audio data, so as to approximate neighboring unedited audio portions of the cut points around the audio edit region. In existing systems, DSP techniques for pitch-shifting and time-stretching typically create undesirable artifacts and usually require separate training for each speaker of audio data to be operated on. In contrast, some embodiments described herein do not require training per speaker and, further, address undesirable artifacts by applying artifact removal techniques such as through the use of an ML model trained for this purpose. Existing systems for audio enhancement enable audio editing but fail to do so in a manner that effectively adjusts prosody based on context for prosodic continuity in a high-quality result. Thus, embodiments described herein represent an improvement over such systems.

Referring now to the drawings, FIG. 1 is a diagram of an example architecture of a correction system 100 for correcting prosody in subject audio data, according to some embodiments described herein. As shown in FIG. 1, some examples of the correction system 100 include one or both of a training system 110 and an operations system 120. In general, the training system 110 performs initialization tasks such as training ML models used by the operations system 120, and the operations system 120 operates on audio data to determine and apply a target prosody. In some embodiments, the training system 110 performs a set of operations once for initialization or as needed to update the ML models, and the operations system 120 performs a set of operations on input audio data 105 each time it is desired to correct the prosody of subject audio data in an edit region.

In some embodiments, the operations system 120 receives a request to correct the prosody of subject audio data in an edit region of the input audio data 105 in an audio recording. Although some embodiments described herein are particularly suited to audio recordings that are speech audio and thus include speech audio data, in other embodiments, the audio recording could fall into other categories, such as audio that involves rapping or singing within a flattened range. The edit region, also referred to herein as the audio edit region, can be a region of the audio recording that has been, or is flagged to be, edited. The edit region includes subject audio data, which can include edited audio data but may additionally include a portion of audio data that has not been edited but is adjacent to the edited audio data and is being treated as a common region with the edited audio data. In some embodiments, the input audio data 105 additionally includes unedited audio data in an unedited audio portion of the audio recording, where the unedited audio portion is outside of the edit region. In some examples, the unedited audio portion includes a combination of audio adjacent to the edit region on one side of the edit region and additional audio adjacent to the edit region on the other side of the edit region. As described below, some embodiments use the unedited audio portion as a reference in correcting the prosody of the subject audio data in the edit region.

In some embodiments, the edit region is located at a specific position, or index, of the input audio data 105. Thus, the subject audio data differs from audio data that was originally recorded or previously existed at the position of the audio edit region. In some embodiments, a client device 130 makes the request to the operations system 120. The client device 130 may be a separate device from the operations system 120, or alternatively, the operations system 120 is integrated with the client device 130 in whole or in part. For instance, the operations system 120 may run as an application on the client device 130. To initiate the request for prosody correction, a user could edit audio data at the client device 130 using an audio editing program 135, which may implement a text-based speech editing technique or other form of audio editing. Through such editing, the client device 130 generates the subject audio data. The client device 130 then communicates the edited audio recording, or at least the subject audio data, to the operations system 120 as input audio data 105 along with a request to correct the prosody of the subject audio data in the context of the input audio data 105 and, more specifically, in the context of the unedited audio data in the unedited audio portion of the audio recording.

The operations system 120 may include, or may otherwise access, one or more of the following, which act as subsystems of the operations system 120: a phoneme duration model 150b, a pitch generation model 160b, a prosody application subsystem 170, and an artifact removal model 180b. In response to the request received by the operations system 120, an example of the phoneme duration model 150b determines (e.g., predicts), based on the context of the unedited audio portion, a respective duration (e.g., in seconds) for each phoneme in the subject audio data of the edit region. Given the phonemes of the subject audio data and their associated durations as predicted by the phoneme duration model 150b, and further based on the context of the unedited audio portion, an example of the pitch generation model 160b determines (e.g., predicts) a respective pitch for each audio frame of the edit region. The operations system 120 can then assign a respective pitch to each phoneme of the subject audio data in the edit region according to which audio frame includes that phoneme. Together, the predicted phoneme durations and pitches of the phonemes of the subject audio data form a target prosody for the subject audio data, and an example of the prosody application subsystem 170 applies that target prosody to the subject audio data. This application may introduce some undesirable artifacts such as noise or reverberation, and thus, an example of the artifact removal model 180b removes such artifacts. These operations will be described in more detail below.

The operations system 120 may output the subject audio data, modified as described above, as output audio data 195 to enable the client device 130 to combine that output with the unedited audio portion of the audio recording. Additionally or alternatively, the operations system 120 may provide output audio data 195 that includes the subject audio data, as modified, along with the unedited audio data.

In some embodiments, prior to initial operation of the operations system 120, the training system 110 operates on one or more of the following ML models, also referred to herein as models, for the purpose of training these models: the phoneme duration model 150a, the pitch generation model 160a, and the artifact removal model 180a. In some examples, the training system 110 trains each of the phoneme duration model 150a, the pitch generation model 160a, and the artifact removal model 180a individually. Additionally or alternatively, in some examples, one or more of these ML models may be trained outside of the correction system 100 rather than being trained by the training system 110 as shown in FIG. 1. After training, the trained versions of each of the phoneme duration model 150b, the pitch generation model 160b, and the artifact removal model 180b are accessible to the operations system 120 to enable the operations system 120 to use these models to correct prosody as described herein.

In some embodiments, the phoneme duration model 150b is an ML model such as a neural network. During operation, the phoneme duration model 150b inputs phonemes that have been extracted from the subject audio data and, in some examples, one-hot encoded. The phoneme duration model outputs, for each phoneme, a duration based on the context of the unedited audio portion. The duration may be output in terms of seconds and may be upper-bounded (e.g., at half a second) to prevent long silences in the final edit region.

An example of the phoneme duration model 150b is implemented as a sequence-to-sequence model including an encoder and decoder. For example, the encoder is or includes two one-dimensional (1D) convolution blocks followed by a bidirectional gated recurrent unit (GRU). Each convolution block includes of a convolution with 512 channels and a kernel size of 5, rectified linear (ReLU) activation, and batch normalization. For example, the decoder is or includes a unidirectional GRU with 256 channels followed by a linear layer.

During training, an example of the phoneme duration model 150a learns to minimize the mean-squared error between real-valued phoneme durations predicted and ground truth durations extracted with, for instance, the Penn Phonetic Forced Aligner. In some embodiments, the training system 110 trains the phoneme duration model 150a in a single-speaker fashion on each dataset. For this purpose, a dataset may include two hours of speech for training and two hours for validation. The training system 110 may train the phoneme duration model 150a for thirty epochs with a batch size of sixty-four. Further, during training, an embodiment of the training system 110 randomly provides short sequences of ground truth phoneme durations as input features. To this end, the training system 110 may randomly select half of the training samples to have k adjacent ground truth durations, where k~Uniform(0, 24), so that the model learns to fill in remaining durations in a context-aware manner.

In some embodiments, the pitch generation model 160*b* is an ML model such as a neural network and, more specifically, such as a sequence-to-sequence model. The pitch generation model 160*b* may receive as input a sequence of phonemes divided into audio frames based on their respective durations, as determined by the phoneme duration model 150*b*. Each audio frame may have the same time length, such as ten milliseconds, and the pitch generation model 160*b* generates a pitch, also referred to as a pitch value, for each such audio frame based on the context of the audio portion.

In some embodiments, during training, the pitch generation model learns to predict respective pitches of audio frames, given a sequence of phonemes associated with respective durations. Ground truth pitch values for use in training may be extracted using, a pitch tracker (e.g., Convolutional REpresentation for Pitch Estimation (CREPE) pitch tracker). To reduce double and half frequency errors, some embodiments of the training system 110 decode the pitch from a sequence of categorical distributions, such as those predicted by Crepe using Viterbi decoding. The training system 110 may extract and identify voiced and unvoiced tokens, such as by performing hysteresis thresholding on Crepe's network confidence value.

An example of the pitch generation model 160*b* is or includes the Controllable Deep AutoRegress (C-DAR) model for pitch generation. C-DAR generates a pitch value for each ten-millisecond frame of speech from one-hot encoded phonemes and linguistic features that have been upsampled according to input phoneme durations. C-DAR predicts a categorical distribution over a discrete set of possible pitch values, such as 128 possible pitch values that are evenly distributed between −4 and +4 standard deviations from a speaker's average pitch in base-2 log-space.

As mentioned above, the prosody application subsystem 170 may apply the target prosody, as determined by the phoneme duration model 150*b* and the pitch generation model 160*b*, to the subject audio data in the edit region. In some embodiments, the prosody application subsystem 170 takes as input the phoneme durations, the pitch contour, and the subject audio data (e.g., a waveform). In accordance with the target prosody, the operations system 110 provides to the prosody application subsystem 170 pitch values and a time-stretching rate for each audio frame of the edit region, where the time-stretching rate is a sequence of ratios between the original phoneme durations of the subject audio data and the predicted phoneme durations, each repeated by the number of audio frames occupied by the original phoneme. The prosody application subsystem 170 outputs the subject audio data (e.g., another waveform), which has been adjusted to more closely match the target prosody.

In some embodiments, the prosody application subsystem 170 can but need not be an ML model, and if the prosody application subsystem 170 is not an ML model, the prosody application subsystem 170 need not be trained by the training system 110. In some embodiments, the prosody application subsystem 170 is or includes a DSP technique. To apply the target prosody to the subject audio data, the prosody application subsystem 170 performs pitch-shifting and time-stretching, such as, for example, through the use of a vocoder such as Time-Domain Pitch-Synchronous Overlap-and-Add (TD-PSOLA). Although the prosody application subsystem 170 could additionally or alternatively use the WORLD vocoder, TD-PSOLA tends to provide superior naturalness and pitch-shifting capabilities in experimentation. TD-PSOLA works by pitch-tracking the signal representing the subject audio data to determine locations (i.e., pitch epochs) to split the signal into chunks corresponding to periods. These chunks are then repeated to perform time-stretching, or the chunks are shifted to modify the potential overlap with adjacent chunks to perform pitch-shifting. The modified chunks are combined via Overlap-Add to create the pitch-shifted and time-stretched speech signal of the subject audio data.

In some embodiments, the DSP technique used by the prosody application subsystem 170 introduces artifacts into the subject audio data, and the artifact removal model 180*b* removes or reduces such artifacts. During operation, the artifact removal model 180*b* takes as input the subject audio data, as output by the prosody application subsystem 170, and outputs a modified version of the subject audio data that approximates the target prosody and has reduced artifacts as compared to the version output by the prosody application subsystem 170. Specifically, for instance, the modified version has reduced noise, reverberation, or a combination of noise or reverberation. To this end, during training, the artifact removal model 180*a* learns to remove artifacts, such as noise and reverberation from audio data. The artifact removal model 180*a* may be an ML model such as a neural network, and the training system 110 may train the artifact removal model 180*a* to map audio data with artifacts to cleaner audio data.

An example of the artifact removal model 180*a* is or includes HiFi-GAN, a neural network trained with a generative adversarial network (GAN) loss so as to learn to transform noisy or reverberant speech recordings to clean, high-fidelity speech. In other words, the artifact removal model 180*a* is trained as a generator and, as such, is trained jointly with a discriminator in the context of a GAN. In the GAN, the artifact removal model 180*a* learns to generate modified audio data that has a reduction in noise or reverberation as compared to corresponding audio data provided as input. Specifically, an example of the artifact removal model 180*a* is or includes HiFi-GAN as described in Jiaqi Su et al., "HiFi-GAN: High-fidelity denoising and dereverberation based on speech deep features in adversarial network," arXiv preprint arXiv:2006.05694 (2020), which is incorporated by reference herein. While HiFi-GAN is typically trained only to perform speech denoising and dereverberation, the model can still be effective at reducing the artifacts introduced by pitch-shifting and time-stretching. HiFi-GAN need not be trained in a speaker-dependent manner and is thus speaker agnostic. Thus, the use of HiFi-GAN or a similar model enables the correction system 100 to avoid using complex, speaker-dependent neural vocoders that can be difficult to implement for interactive applications. Additionally, HiFi-GAN typically operates in real time or faster, which makes it well suited for interactive applications.

Figure 2:
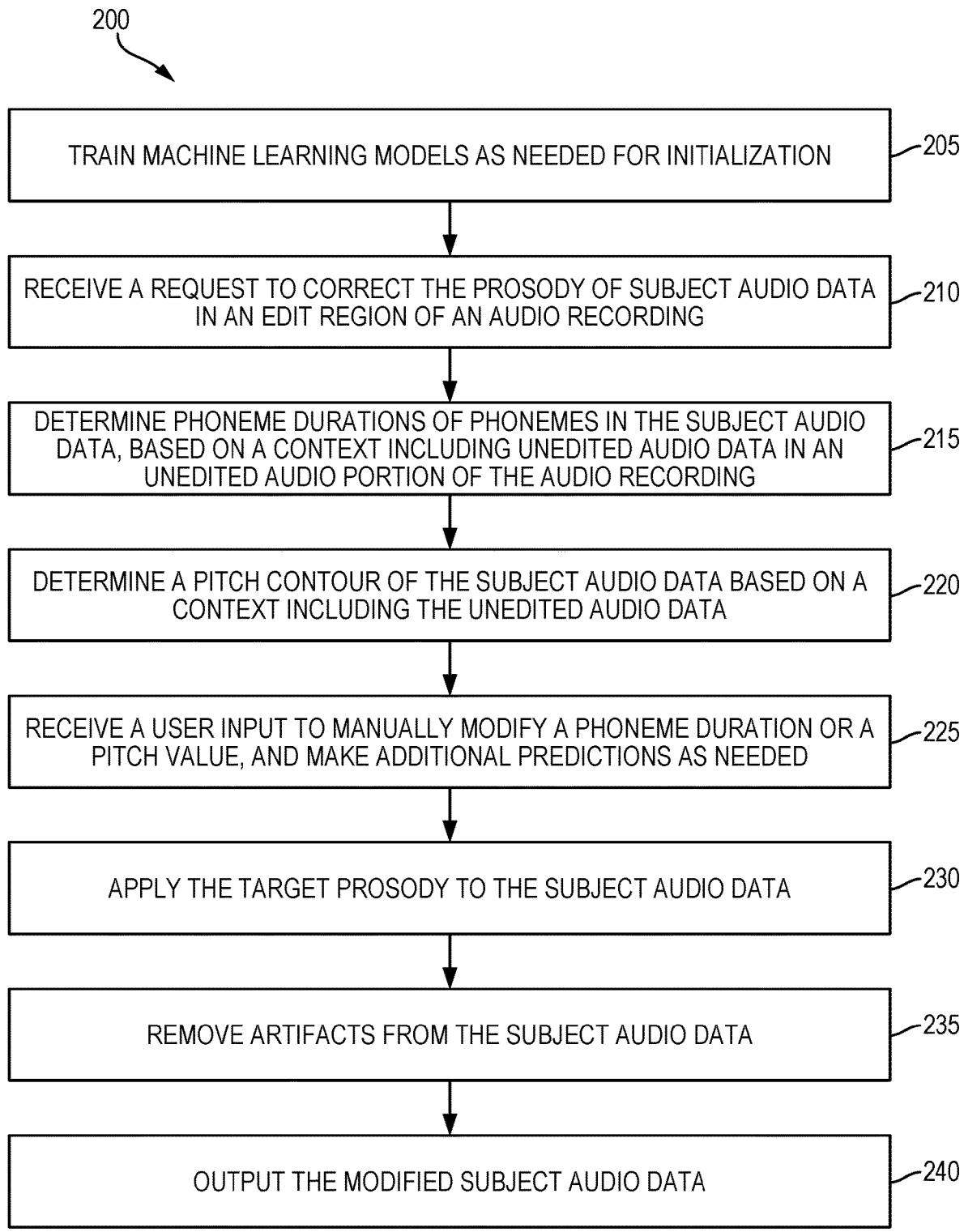
FIG. 2 is a diagram of an example of a process for correcting prosody of subject audio data in an edit region of an audio recording, according to some embodiments described herein.

FIG. 2 is a diagram of an example of a process 200 for correcting the prosody of subject audio data in an edit region of an audio recording, according to some embodiments described herein. The process 200 depicted in FIG. 2 may be implemented in software executed by one or more processing units of a computing system, implemented in hardware, or implemented as a combination of software and hardware. This process 200 is intended to be illustrative and non-limiting. Although FIG. 2 depicts various processing operations occurring in a particular order, the particular order depicted is not required. In certain alternative embodiments, the processing may be performed in a different order, some operations may be performed in parallel, or operations may be added, removed, or combined together.

As shown in FIG. 2, at block 205, the process 200 may involve training each ML model that requires training. The ML models can include one or more of the phoneme duration model 150a, the pitch generation model 160a, and the artifact removal model 180a, and in some embodiments, the training system 110 trains each of such models that require training and does so prior to correcting the prosody of any subject audio data in an edit region. In some embodiments, one or more ML models of the correction system 100 are trained outside of the correction system 100 and thus need not be trained by the training system 110. This training need not be performed for each prosody correction needed but, rather, may be performed once as an initialization operation or as needed to refine the ML models.

At block 210, the process 200 involves receiving a request to correct the prosody of subject audio data in an edit region, where the request indicates a position of the edit region in the audio recording. The operations system 110 may then access the subject audio data in the edit region and the unedited audio data in the unedited audio portion of the audio recording to perform the operations described below. In some embodiments, the subject audio data has already been inserted into the audio edit region, but this need not be the case. In either case, when inserted into the audio recording at the indicated position, the edit region along with the unedited audio portion form input audio data 105 to be operated on as described below. An example visual representation of audio data including an edited audio region will be described below, with reference to FIG. 3.

At block 215, the process 200 involves determining phoneme durations including a respective phoneme duration for each phoneme in the subject audio data specified in the request received at block 210. In some embodiments, as described further below, the operations system 120 determines the phoneme durations by applying the phoneme duration model 150b to a sequence of phonemes extracted from the input audio data 105 (i.e., both the subject audio data and the unedited audio portion). The phoneme duration model 150b outputs the respective durations of each phoneme in the subject audio data. This operation will be described in more detail below, with reference to FIG. 4.

At block 220, the process 200 involves determining a pitch contour, including at least one respective pitch for each phoneme of the subject audio data. In some embodiments, as described further below, the operations system 120 determines the pitch contour by applying the pitch generation model 160b to audio frames of the input audio data 105, in which the subject audio data is now assumed to have the phoneme durations determined at block 215. Based on the pitches predicted for the various audio frames, the operations system 110 can assign a respective pitch value to each phoneme of the subject audio data. This operation will be described in more detail below, with reference to FIG. 5.

In this disclosure, prosody refers to a combination of pitch and phoneme duration. Thus, the phoneme durations determined at block 215 and the pitch contour determined at block 220 together form a target prosody for the subject audio data.

At block 225, the process 200 involves receiving a user input and modifying a phoneme duration or pitch value, as determined at block 215 or 220, based on the user input. For instance, the audio editing application 135 at the client device 130 may present the user with a user interface through which the user may specify respective durations or pitch values of specific phonemes, such as by adjusting the phoneme durations or pitch values that were automatically determined as described above. In one example, the operations system 120 generates a variety of candidate phoneme durations or pitch values for a phoneme and allows the user to select one of such candidates for use. In some embodiments, if the user input specifies a phoneme duration for a phoneme of the subject audio data in the edit region, that phoneme duration replaces the predicted phoneme duration for the phoneme. Analogously, if the user input specifies a pitch value for a phoneme of the subject audio data, that pitch value replaces the predicted pitch value for the phoneme. Further, in some embodiments, if the user input specifies values for phoneme duration, pitch, or both for only a subset of the phonemes in the subject audio data, rather than for all phonemes in the subject audio data, then the operations system 120 may re-predict the phoneme durations and pitch values of the remaining phonemes of the subject audio data to ensure prosodic continuity.

In some embodiments, a user of the client device 130 is enabled to provide such a user input before the predictions of phoneme durations and pitch contour are performed at block 215 and 220. In that case, if a user input is received that indicates respective phoneme durations and pitch values for all phonemes of the subject audio data, then the operations system 120 may use the user input in place of performing the predictions of blocks 215 and 220. However, if the user input specifies values for phoneme duration, pitch, or both for only a subset of the phonemes in the subject audio data, the operations system 120 may predict the phoneme durations and pitch values of the remaining phonemes of the subject audio data to ensure prosodic continuity.

At block 230, the process 200 involves applying the target prosody to the subject audio data to match, or at least more closely match, the target prosody determined at blocks 215-225. To this end, in some embodiments, the prosody application subsystem 170 of the operations system 120 performs pitch-shifting and time-stretching through digital signal processing. In some examples, the prosody application subsystem 170 is or utilizes TD-PSOLA to implement the pitch-shifting and time shifting. Additionally or alternatively, the prosody application subsystem 170 is or utilizes a different DSP technique or a neural vocoder.

At block 235, the process 200 involves removing artifacts from the subject audio data produced at block 230. To this end, for instance, the operations system 120 applies the artifact removal model 180b to the modified subject audio data in the edit region. At block 240, the operations system 120 outputs the modified subject audio data. In outputting the modified subject audio data, the operations system 120 may output audio data 195 that includes both the unedited audio data in the unedited audio portion and the subject audio data, modified as described above, in edit region.

Figure 3:
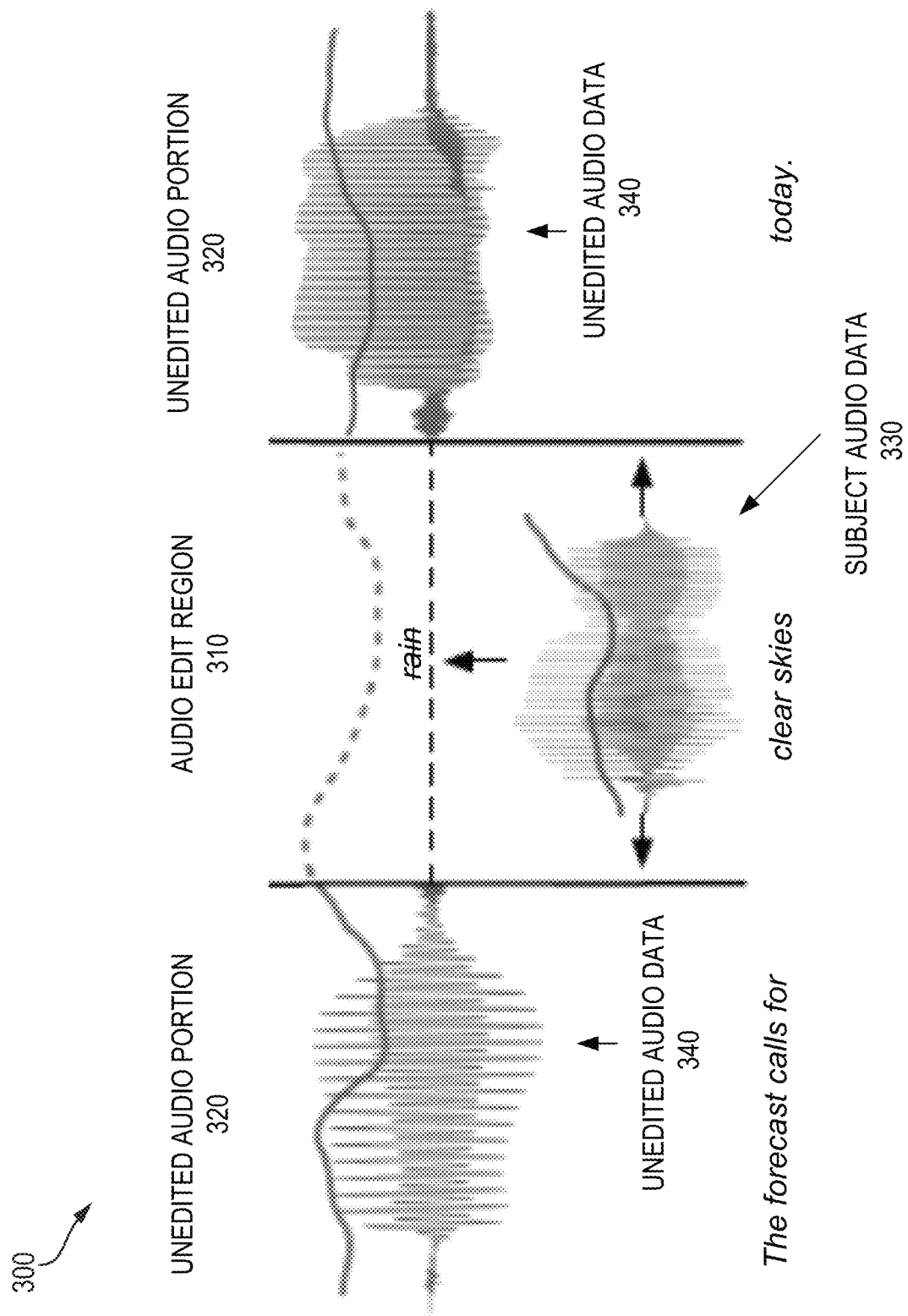
FIG. 3 is an example visual representation of audio data including an edited audio region, according to some embodiments described herein.

FIG. 3 is an example visual representation 300 of audio data including an edited audio region 310, according to some embodiments described herein. An audio recording is originally for the speech "the forecast calls for rain today" spoken by a specific speaker, a user might wish to replace "rain" with "clear skies" to accurately reflect the forecast for the day. The user could use a text-based speech editor to cut out the word "rain" and insert the words "clear skies" in its place, which can be synthesized using the specific speaker's own voice. Thus, a modified audio recording is created corresponding to the speech "the forecast calls for clear skies today". The modified audio recording has an audio edit region 310 including subject audio data 330. The subject audio data 330 includes edited audio data. In this example, the edited audio data corresponds to "clear skies." The modified audio recording also has an unedited audio portion 320 including unedited audio data 340. In this example, the unedited audio data 340 corresponds to "the forecast calls" and "today." The unedited audio data 340 provides context to the edited audio data.

Figure 4:
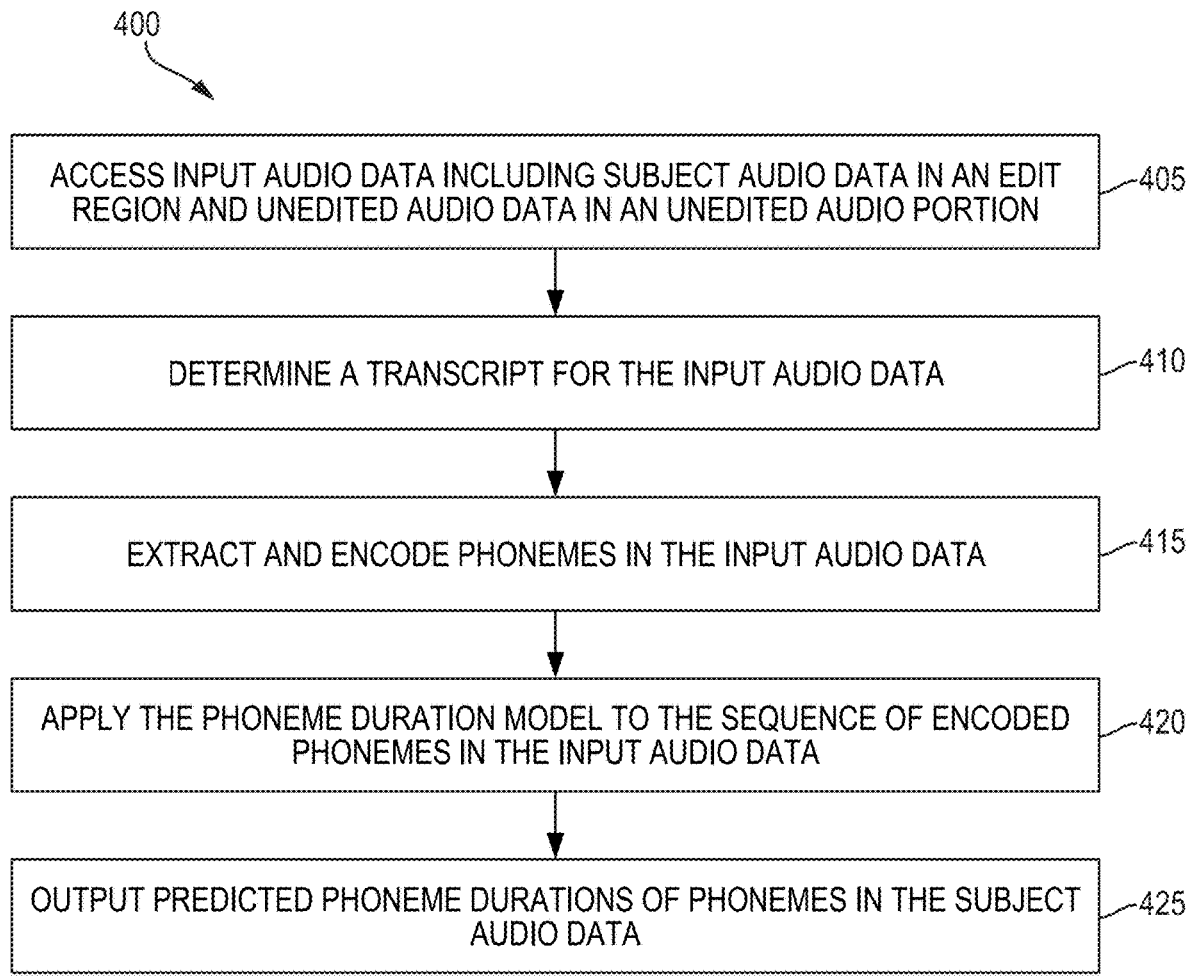
FIG. 4 is a diagram of an example of a process for determining phoneme durations of phonemes in subject audio data in an edit region of an audio recording, according to some embodiments described herein.

FIG. 4 is a diagram of an example of a process 400 for determining phoneme durations of phonemes in the subject audio data in the edit region, according to some embodiments described herein. In some embodiments, this process 400 is performed by the operations system 120 and involves the phoneme duration model 150b. The operations system 120 can use this process 300 or similar to implement block 215 of the above process 200 illustrated in FIG. 2. The process 400 depicted in FIG. 4 may be implemented in software executed by one or more processing units of a computing system, implemented in hardware, or implemented as a combination of software and hardware. This process 400 is intended to be illustrative and non-limiting. Although FIG. 4 depicts various processing operations occurring in a particular order, the particular order depicted is not required. In certain alternative embodiments, the processing may be performed in a different order, some operations may be performed in parallel, or operations may be added, removed, or combined together.

As shown in FIG. 4, at block 405, the process 400 involves accessing input audio data 105 including an unedited audio portion and an edit region inserted at an indicated position in the input audio data 105. As discussed above, the correction system 100 is configured to correct the prosody of subject audio data in the edit region based on the context of unedited audio data in the unedited audio portion.

At block 410, the process 400 involves determining a transcript for the input audio data 105. In some embodiments, the subject audio data was generated on the client device 130 through text-based speech editing, and in that case, a transcript is known at the client device 130 and could be provided as part of the request to correct the prosody. Additionally or alternatively, however, the operations system 120 may utilize a speech-to-text technique to determine the transcript.

At block 415, the process 400 involves extracting and encoding phonemes in the input audio data 105. Various techniques exist for extracting phonemes from a transcript of speech, and the operations system 120 may use one or more of such techniques. For instance, the operations system 120 may use a grapheme-to-phoneme conversion to convert the transcript determined at block 305 to a sequence of phonemes in the input audio data 105 and, more specifically, in the subject audio data in edit region and the unedited audio data in unedited audio portion. In some embodiments, encoding the phonemes converts each phoneme into a corresponding numerical representation that encodes, or represents, that phoneme. The operations system 120 may perform one-hot encoding of the phonemes based on linguistic features, but other encoding techniques may be used additionally or alternatively.

At block 420, the process 400 involves applying the phoneme duration model 150b to the sequence of encoded phonemes and their associated initial durations. In the case of the phonemes from the unedited audio data in the unedited audio portion, the actual durations of such phonemes may be input into the phoneme duration model 150b. In the case of the phonemes from the subject audio data in the edit region, however, the durations may be masked, such as by being zeroed out. As discussed above, the phoneme duration model 150b may be sequence-to-sequence model and thus may consider the context of each input within the sequence. Because the phoneme duration model 150b is applied to a sequence of phonemes including both the subject audio data and unedited audio data, the predicted phoneme durations are determined based on that larger context. In some embodiments, the phoneme duration model 150b outputs a sequence of predicted phoneme durations that correspond to the input encoded phonemes. An example of the operations system 120 discards the predicted phoneme durations output for phonemes in the unedited audio data but keeps the predicted phoneme durations for phonemes of the subject audio data for use in the remainder of this process 400.

At block 425, the process 400 involves outputting the predicted phoneme durations of the phonemes in the subject audio data. These phonemes are thus incorporated in the target prosody for the subject audio data.

Figure 5:
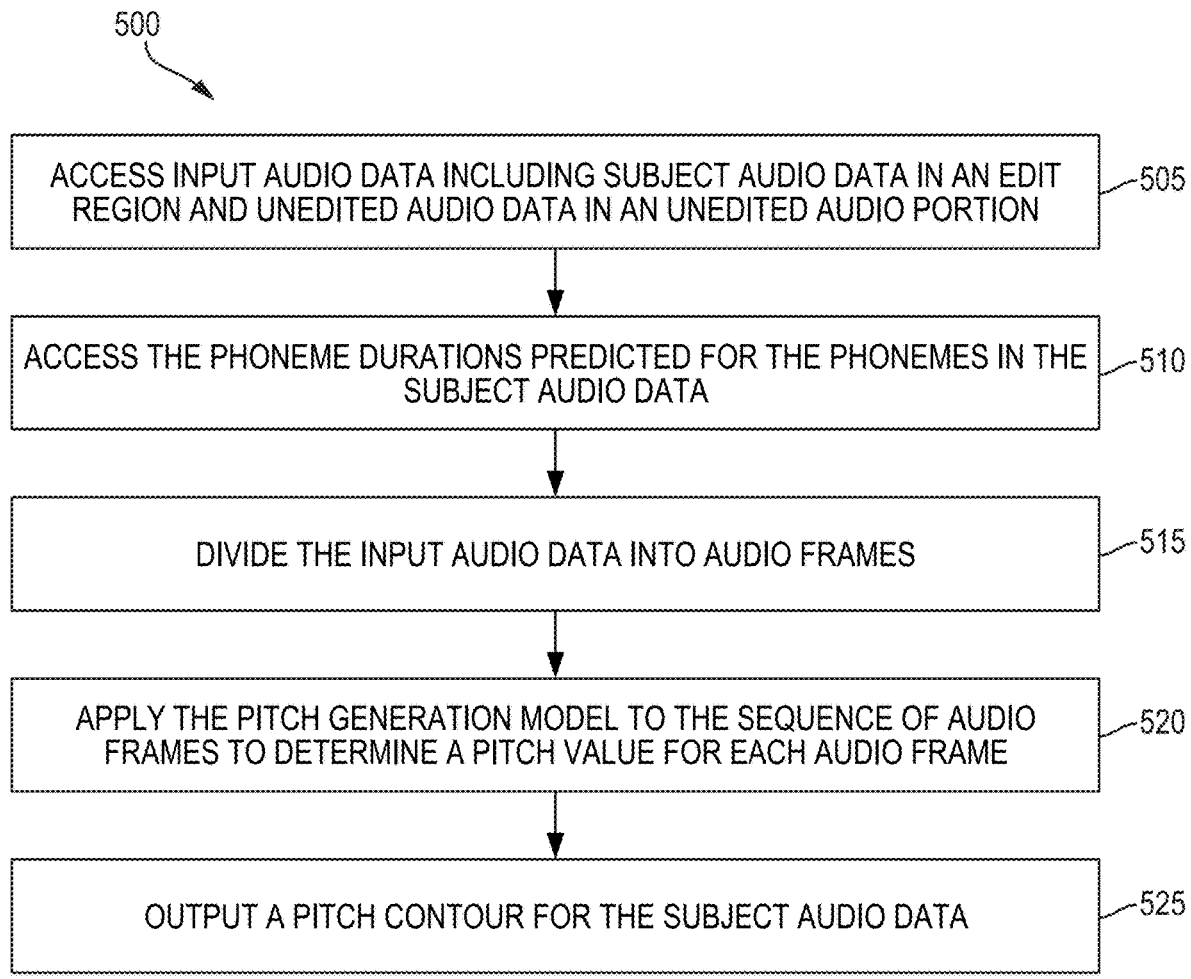
FIG. 5 is a diagram of an example of a process for determining a pitch contour for subject audio data in an edit region of an audio recording, according to some embodiments described herein.

FIG. 5 is a diagram of an example of a process 500 for determining a pitch contour for the subject audio data in the edit region, according to some embodiments described herein. In some embodiments, this process 500 is performed by the operations system 120 and involves the pitch generation model 160b. The operations system 120 can use this process 500 or similar to implement block 220 of the above process 200 illustrated in FIG. 2. The process 500 depicted in FIG. 5 may be implemented in software executed by one or more processing units of a computing system, implemented in hardware, or implemented as a combination of software and hardware. This process 500 is intended to be illustrative and non-limiting. Although FIG. 5 depicts various processing operations occurring in a particular order, the particular order depicted is not required. In certain alternative embodiments, the processing may be performed in a different order, some operations may be performed in parallel, or operations may be added, removed, or combined together.

As shown in FIG. 5, at block 505, the process 500 involves accessing input audio data 105 including an unedited audio portion and an edit region inserted at an indicated position in the input audio data 105. At block 510, the process 500 involves accessing the phoneme durations of each phoneme in the input audio data 105. The phoneme durations include the original phoneme durations from the unedited audio data in the unedited audio portion and the predicted phoneme durations for the subject audio data in the edit region.

At block 515, the process 500 involves dividing the input audio data 105 into intervals, referred to herein as frames or audio frames. For the purpose of identifying the audio frames, each phoneme in the subject audio data may have the predicted duration predicted for that phoneme as described above, while the phonemes in the unedited audio data (i.e., outside the edit region) may have their original phoneme durations. In some examples, the audio frames are equal length, and for instance, each audio frame has a duration of ten milliseconds. However, various implementations are within the scope of this disclosure. In some embodiments, an audio frame at a boundary (e.g., at the cut points around the edit region, or at the beginning or end of the unedited audio portion) may have a different length than other audio frames. Alternatively, however, the input audio data 105 may be padded as needed to ensure that all audio frames have an equal length.

At block 520, the process 500 involves applying the pitch generation model 160b to the sequence of audio frames. In the case of an audio frame including a phoneme from the unedited audio data in the unedited audio portion, the actual pitch value of that phoneme may be input into the pitch generation model 160b. In the case of an audio frame including a phoneme from the subject audio data in the edit region, however, the pitch value for that audio frame may be masked, such as by being zeroed out. Given this input data, which includes the context of pitch values in the unedited audio data of the unedited audio portion, the pitch generation model 160b may then predict a respective pitch for each audio frame in the input audio data 105.

Each phoneme in the subject audio data may be associated with (i.e., assigned to) at least one pitch value according to the respective pitches of the audio frames determined at block 520. Generally, a phoneme is associated with an audio frame that includes that phoneme. In some cases, a phoneme may cross over audio frames and may thus have, and be associated with, multiple pitch values if pitch varies across such audio frames. A set of pitch values associated with a phoneme can form a pitch curve representing the variation in pitch values as well as the duration of each such pitch value throughout the duration of the phoneme.

In some embodiments, the pitches of the phonemes in the unedited audio data in the unedited audio portion may remain unchanged, regardless of the predictions made at block 520, and only the pitches in the subject audio data in the edit region are impacted by the output of pitch generation model 160b.

At block 525, the process 500 involves outputting a pitch contour describing the variation in pitch across the subject audio data. In some embodiments, the pitch contour includes at least one pitch value per phoneme. Further, the pitch contour incorporates the phoneme durations, such as by including start and stop time points for each phoneme and for each respective pitch value. The pitch contour is thus incorporated in the target prosody for the subject audio data.

As discussed above, the phoneme durations determined in the process 400 of FIG. 4 and the pitches determined in the process 500 of FIG. 5 together form a target prosody for the subject audio data in the edit region. In some embodiments, the operations system 120 applies this target prosody to the subject audio data, such as by using the prosody application subsystem 170, and may remove artifacts from the subject audio data to generate modified subject audio data. The operations system 120 may output the modified subject audio data. In some embodiments, the operations system 120 outputs the modified subject audio data without the unedited audio portion, to enable the high-quality subject audio data to be combined with the unedited audio portion elsewhere, or the operations system 120 outputs output audio data 195 including the modified subject audio data in the edit region combined with the unedited audio data in the unedited audio portion. Various implementations are possible and are within the scope of this disclosure.

Figure 6:
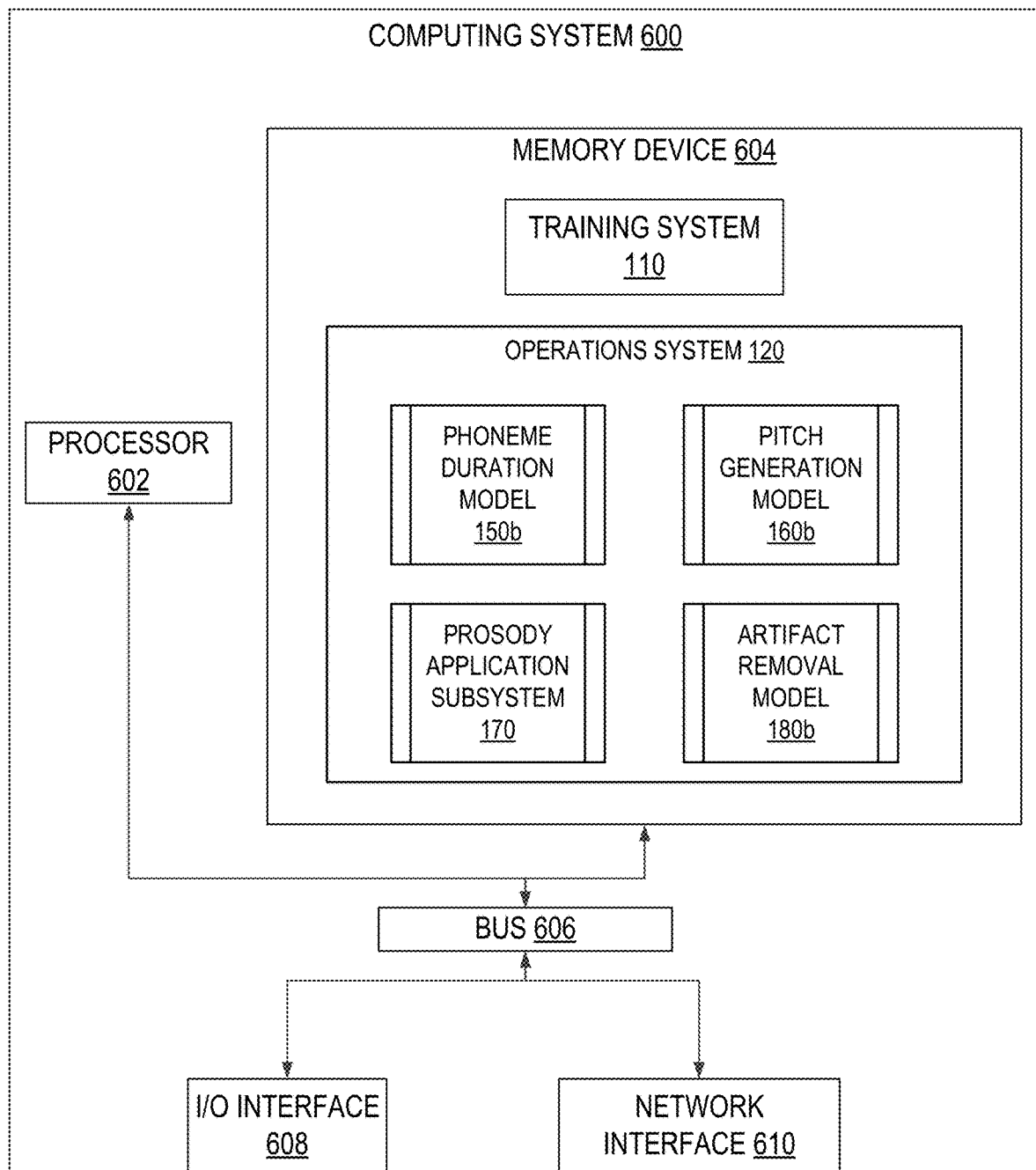
FIG. 6 is a diagram of an example of a computing system for performing certain operations described herein, according to some embodiments.

A suitable computing system or group of computing systems can be used for performing the operations described herein. For example, FIG. 6 depicts an example of a computing system 600 that can be used to execute the training system 110, the operations system 120, or various other aspects of the correction system described herein. In some embodiments, for instance, the computing system 600 executes all or a portion of the training system 110, the operations system 120, or both. In other embodiments, the computing system 600 executes the operations system 120, and an additional computing system, which may be outside the correction system 100, having devices similar to those depicted in FIG. 6 (e.g., a processor, a memory, etc.) executes the training system 110.

The depicted example of a computing system 600 includes a processor 602 communicatively coupled to one or more memory devices 604. The processor 602 executes computer-executable program code stored in a memory device 604, accesses information stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices, including a single processing device.

The memory device 604 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 600 may also include a number of external or internal devices, such as input or output devices. For example, the computing system 600 is shown with one or more input/output ("I/O") interfaces 508. An I/O interface 608 can receive input from input devices or provide output to output devices. One or more buses 606 are also included in the computing system 600. The bus 606 communicatively couples one or more components of a respective one of the computing system 600.

The computing system 600 executes program code that configures the processor 602 to perform one or more of the operations described herein. The program code includes, for example, the phoneme duration model 150b, the pitch generation model 160b, the prosody application subsystem 170, the artifact removal model 180b, or other suitable models, subsystems, or applications that perform one or more operations described herein. The program code may be resident in the memory device 604 or any suitable computer-readable medium and may be executed by the processor 602 or any other suitable processor. In some embodiments, both the training system 110 and the operations system 120 are stored in the memory device 604, as depicted in FIG. 6. In additional or alternative embodiments, one or more of the training system 110 and the operations system 120 are stored in different memory devices of different computing systems. In additional or alternative embodiments, the program code described above is stored in one or more other memory devices accessible via a data network.

The computing system 600 can access the ML models of the correction system 100 or other models, datasets, or functions in any suitable manner. In some embodiments, some or all of one or more of these models, datasets, and functions are stored in the memory device 604 of a common computer system 600, as in the example depicted in FIG. 6. In other embodiments, such as those in which the training system 110 is executed on a separate computing system, that separate computing system that executes the training system 110 can provide access to the ML models described herein to enable execution of the operations system 120 on the computing system 600. In additional or alternative embodiments, one or more programs, models, datasets, and functions described herein are stored in one or more other memory devices accessible via a data network.

The computing system 600 also includes a network interface device 610. The network interface device 610 includes any device or group of devices suitable for establishing a wired or wireless data connection to one or more data networks. Non-limiting examples of the network interface device 610 include an Ethernet network adapter, a modem, and the like. The computing system 600 is able to communicate with one or more other computing devices (e.g., a separate computing device acting as a client device 130) via a data network using the network interface device 610.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices perform operations comprising:
   accessing an audio recording comprising unedited audio data in an unedited audio portion and subject audio data in an audio edit region, wherein the subject audio data comprises edited audio data, and wherein the unedited audio portion is distinct from the audio edit region;
   predicting, using a first machine learning model based on a first context of the unedited audio data, phoneme durations comprising a respective phoneme duration of each phoneme in the subject audio data, wherein the first context of the unedited audio data comprises original phoneme durations of the unedited audio data;
   dividing the audio recording into multiple audio frames based on predicted phoneme durations;
   predicting, using a second machine learning model based on a second context of the unedited audio portion, a pitch value for each of the multiple audio frames in the subject audio data, wherein the second context of the unedited audio data comprises original pitch values for the unedited audio data, and wherein the second machine learning model is distinct from the first machine learning model;
   assigning at least one pitch value to each phoneme in the subject audio data to create a pitch contour; and
   correcting prosody of the subject audio data by applying the phoneme durations and the pitch contour to the subject audio data.

2. The method of claim 1, wherein predicting the phoneme durations comprises identifying each phoneme in the subject audio data based on a transcript of the subject audio data.

3. The method of claim 1, wherein predicting the phoneme durations comprises applying, to each phoneme in the subject audio data, a sequence-to-sequence machine learning model comprising an encoder and a decoder.

4. The method of claim 3, wherein the encoder comprises two one-dimensional convolution blocks and a bidirectional gated recurrent unit, and wherein the decoder comprises a unidirectional gated recurrent unit and a linear layer.

5. The method of claim 3, wherein a speaker of the subject audio data and the unedited audio data is distinct from a set of speakers on which the sequence-to-sequence machine learning model for predicting the phoneme durations was trained.

6. The method of claim 1, wherein predicting the pitch contour of the subject audio data comprises:
   dividing the audio edit region into equal-length audio frames of 10 milliseconds; and
   generating a respective pitch value for the subject audio data in each equal-length audio frame of the audio edit region.

7. The method of claim 6, wherein generating a respective pitch value for each equal-length audio frame of the audio edit region comprises applying a machine learning model to select the respective pitch value from a categorical distribution over a discrete set of pitch values.

8. The method of claim 6, wherein a speaker of the subject audio data and the unedited audio data is distinct from a set of speakers on which the machine learning model for selecting the respective pitch value was trained.

9. The method of claim 1, wherein applying the phoneme durations and the pitch contour to the subject audio data comprises performing digital signal processing on the subject audio data.

10. The method of claim 9, the operations further comprising applying an artifact removal model to the subject audio data after performing the digital signal processing on the subject audio data.

11. The method of claim 9, the operations further comprising, after performing the digital signal processing on the subject audio data, applying to the subject audio data a neural network trained in a generative adversarial network to remove at least one of noise or reverberation from the subject audio data.

12. A system comprising:
a phoneme duration model configured to:
receive input audio data comprising subject audio data in an audio edit region and unedited audio data in an unedited audio portion, wherein the subject audio data comprises edited audio data, and wherein the subject audio data lacks prosodic continuity with the unedited audio data; and
predict, using a first machine learning model based on a first context of the unedited audio data, phoneme durations comprising a respective phoneme duration of each phoneme in the subject audio data, wherein the first context of the unedited audio data comprises original phoneme durations of the unedited audio data;
a pitch generation model configured to:
divide the input audio data into multiple audio frames based on predicted phoneme durations;
predict, using a second machine learning model based on a second context of the unedited audio data, a pitch value for each of the multiple audio frames in the subject audio data, wherein the context of the unedited audio data further comprises original pitch values for the unedited audio data, and wherein the second machine learning model is distinct from the first machine learning model; and
assign at least one pitch value to each phoneme in the subject audio data to create a pitch contour; and
a digital signal processor configured to correct prosody of the subject audio data in audio edit region by applying the phoneme durations and the pitch contour to the subject audio data.

13. The system of claim 12, further comprising a training system configured to train at least one of the phoneme duration model or the pitch generation model.

14. The system of claim 12, further comprising an artifact removal subsystem configured to remove an audio artifact from the subject audio data output by the digital signal processor.

15. A non-transitory computer-readable medium embodying program code for correcting prosody in audio data, the program code comprising instructions that, when executed by a processor, cause the processor to perform operations comprising:

accessing input audio data comprising subject audio data in an audio edit region and unedited audio data in an unedited audio portion of an audio recording, wherein the subject audio data comprises edited audio data, and wherein the subject audio data in the audio edit region lacks prosodic continuity with the unedited audio data in the unedited audio portion;
applying a phoneme duration model to the input audio data to predict phoneme durations comprising a respective phoneme duration of each phoneme in the subject audio data based on a first context of the unedited audio data, wherein the phoneme duration model is based on a first machine learning model, and wherein the first context of the unedited audio data comprises original phoneme durations of the unedited audio data;
applying a pitch generation model to the input audio data to:
divide the input audio data into multiple audio frames based on predicted phoneme durations;
predict a pitch value for each of the multiple audio frames in the subject audio data based on a second context of the unedited audio data, wherein the context of the unedited audio data further comprises original pitch values for the unedited audio data, wherein the pitch generation model is based on a second machine learning model, and wherein the second machine learning model is distinct from the first machine learning model; and
assign at least one pitch value to each phoneme in the subject audio data to create a pitch contour; and
correcting prosody of the subject audio data by utilizing digital signal processing to modify the subject audio data based on the phoneme durations and the pitch contour.

16. The non-transitory computer-readable medium of claim 15, the operations further comprising receiving a user input indicating a manual adjustment to at least one of a phoneme duration or a pitch value of a phoneme in the subject audio data.

17. The non-transitory computer-readable medium of claim 16, the operations further comprising predicting an updated set of phoneme durations for the subject audio data based on the user input.

18. The non-transitory computer-readable medium of claim 16, the operations further comprising predicting an updated pitch contour for the subject audio data based on the user input.

19. The non-transitory computer-readable medium of claim 15, wherein the phoneme duration model comprises a sequence-to-sequence machine learning model comprising an encoder and a decoder.

20. The non-transitory computer-readable medium of claim 15, the operations further comprising applying an artifact removal model to an output of the digital signal processing.

* * * * *